US008121099B2

(12) United States Patent
Han et al.

(10) Patent No.: US 8,121,099 B2
(45) Date of Patent: Feb. 21, 2012

(54) VOICE OVER INTERNET PROTOCOL SYSTEM AND RELATED WIRELESS LOCAL AREA NETWORK DEVICE

(75) Inventors: Chia-Hui Han, Taipei (TW);
Duan-Ruei Shiu, Taipei (TW);
Chi-Huan Tsai, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 616 days.

(21) Appl. No.: 11/806,506

(22) Filed: May 31, 2007

(65) Prior Publication Data

US 2007/0280189 A1    Dec. 6, 2007

Related U.S. Application Data

(60) Provisional application No. 60/803,870, filed on Jun. 4, 2006.

(51) Int. Cl.
*H04W 4/00* (2009.01)
(52) U.S. Cl. ........................................ 370/338; 370/356
(58) Field of Classification Search .................. 370/338,
370/401, 349, 310.2, 328, 352–356, 395.52;
455/11.1, 550.1, 552.1, 553.1, 556.1, 556.2
See application file for complete search history.

(56) References Cited

U.S. PATENT DOCUMENTS 7,023,821 B2 *  4/2006  Wotherspoon et al. ....... 370/329
7,187,941 B2 *  3/2007  Siegel ........................... 455/519
2003/0152056 A1    8/2003  Lee
2005/0192052 A1 *  9/2005  Tenhunen ...................... 455/557
2005/0286466 A1 * 12/2005  Tagg et al. ..................... 370/329
2005/0286546 A1 * 12/2005  Bassoli et al. ................. 370/432
2006/0015197 A1 *  1/2006  Gupta ............................ 700/94

FOREIGN PATENT DOCUMENTS

| CN | 1383317 A | 12/2002 |
| CN | 1399457 A | 2/2003 |
| TW | 546958 | 8/2003 |
| TW | 200512642 | 4/2005 |
| TW | 200642501 | 12/2006 |
| TW | I275277 | 3/2007 |
| TW | I293841 | 2/2008 |
| TW | I311875 | 7/2009 |

* cited by examiner

*Primary Examiner* — Kent Chang
*Assistant Examiner* — San Htun
(74) *Attorney, Agent, or Firm* — CKC & Partners Co., Ltd.

(57) ABSTRACT

A voice over Internet protocol (VoIP) system. The system includes a first device and a second device. The first device is disposed in a wireless local area network (WLAN) and connected to an Internet, for performing voice communication with a remote device through the Internet. Additionally, the first device processes audio information received during the voice communication to generate at least a playback audio packet, sends out the playback audio packet through the WLAN, receives at least a captured audio packet through the WLAN, and processes the captured audio packet to generate audio information to be sent out during the voice communication. The second device is disposed in the WLAN, for receiving the playback audio packet through the WLAN, playing audio information contained in the playback audio packet, capturing outside audio information to generate the captured audio packet, and sending out the captured audio packet through the WLAN.

12 Claims, 5 Drawing Sheets

VOICE OVER INTERNET PROTOCOL SYSTEM AND RELATED WIRELESS LOCAL AREA NETWORK DEVICE

CROSS REFERENCE TO RELATED APPLICATIONS

This non-provisional application claims the benefit of U.S. Provisional Application No. 60/803,870, which was filed on Jun. 4, 2006 and is included herein by reference.

BACKGROUND OF THE INVENTION

1. Field of the Invention

The present invention relates to a wireless local area network (WLAN), and more particularly, to a voice over Internet protocol (VoIP) system and related WLAN device applicable for a WLAN.

2. Description of the Prior Art

As Internet technology advances, Internet-based applications are more and more popular. Voice over Internet protocol (VoIP) and video over Internet protocol, for example, are two common technologies.

After connected to an Internet, a device can perform voice communication with another device through the Internet by VoIP related technology. Such devices include, but not limited to, personal computers and notebook computers that can be connected to the Internet directly by wires. As technology advances, devices not directly connected to the Internet, such as mobile phones and traditional phones (i.e. public switched telephone network (PSTN) phones) can also perform voice communication by VoIP related technology in an indirect manner.

In the prior art utilizing VoIP technology, for example, VoIP software can be executed by a computer to perform voice communication with a remote device. In such a case, an earphone and a microphone are required to play/capture audio information. After users connect the earphone and the microphone to the computer by some physical wires, audio information generated by the VoIP software can be sent to the earphone for play, and audio information captured by the microphone can be sent to the VoIP software for processing. Since every physical wire has inherently a fixed length, the above example of the prior art thus has limitations in use. Those limitations, for example, include limited mobility of the earphone and the microphone. Conventionally, physical wires cannot transmit control information, so users have to use additional input/output (I/O) interface devices (such as mouse and keyboards) for the computer to achieve control operations (such as number input). Limited by the prior art, user scenarios are hard to be expanded by architecture designers.

Additionally, in another example of the prior art, a wireless earphone and a wireless microphone are provided for playing/capturing audio information. In this example, a computer executes VoIP software to perform voice communication with a remote device, and the wireless earphone and the wireless microphone communicate wirelessly with the computer through related wireless interfaces. The wireless interfaces include, for example, proprietary radio frequency (RF) interfaces, digital enhanced cordless telecommunications (DECT) interfaces, and Bluetooth interfaces. Due to low transmission rates and short transmission distances of the above-mentioned wireless interfaces, architecture designers may encounter some technical limitations when designing user scenarios.

In the prior art, an integrated VoIP phone is also provided. FIG. 1 is a schematic diagram illustrating an example of a software architecture of a VoIP phone 100 of the prior art. As shown, the software architecture of the VoIP phone 100 comprises four layers as follows: a user interface finite state machine (UI FSM) layer 120, a middle-ware layer 140, a real time operating system (RTOS) layer 160, and a device driver layer 180.

The UI FSM layer 120, as an example, comprises a plurality of FSMs for call control 121, handset setup 122, VoIP setup 123, and phone book management 124. The RTOS layer 160 operates on a transmission control protocol/Internet protocol (TCP/IP) 161. The device driver layer 180 comprises a network card driver 181, a screen driver 182, an audio interface driver 183, a general-purpose input/output (GPIO) interface driver 184, a universal serial bus (USB) driver 185, and a flash memory driver 186.

The VoIP phone 100 is connected to the Internet through an access point (AP) and is able to perform VoIP related controls and operations independently. The middle-ware layer 140 of the VoIP phone 100 thus has a complicated software architecture. Specifically, the middle-ware layer 140 takes charge of tasks corresponding to session initiation protocol (SIP) 141, network address translation traversal (NAT-T) 142, real time streaming protocol (RTSP) 143, real time transport control protocol (RTCP) 144, resource reserve protocol (RSVP) 145, differentiated services (DiffServ) 146, audio protocol (e.g. G.711 audio codec protocol) 147, quality of service (QoS) 148, real time transport protocol (RTP) 149, and others. Additionally, SIP 141 takes charge of addressing, capability exchange, registration, call setup, and others. QoS 148 takes charge of packet reordering, adaptive jitter compensation, packet lost handling, flow control, echo cancellation, and others. RTP 149 takes charge of payload type identification, sequence numbering, time stamping, delivery monitoring, and others.

As described, the VoIP phone 100 has a complicated software architecture, especially in the middle-ware layer 140. To achieve related complicated computation, the VoIP phone 100 should be implemented by high-level hardware, thereby increasing overall cost. Additionally, complicated computation causes large power consumption and thus decreases available power-on/standby duration for the VoIP phone 100. In conclusion, although the VoIP phone 100 of the prior art has a good mobility, its high price and excessive power consumption are two major drawbacks that repel common consumers.

SUMMARY OF THE INVENTION

According to an embodiment of the present invention, the present invention discloses a voice over Internet protocol (VoIP) system, comprising: a first device, disposed in a wireless local area network (WLAN) and connected to an Internet, for performing voice communication with a remote device through the Internet, wherein the first device processes audio information received during the voice communication with the remote device to generate at least a playback audio packet, sends out the playback audio packet through the WLAN, receives at least a captured audio packet through the WLAN, and processes the captured audio packet to generate audio information to be sent out during the voice communication with the remote device; and a second device, disposed in the WLAN, for receiving the playback audio packet through the WLAN, playing audio information contained in the playback audio packet, capturing outside audio information to generate the captured audio packet, and sending out the captured audio packet through the WLAN.

According to another embodiment of the present invention, the present invention discloses a WLAN device, for performing voice communication with a remote device through a first device, comprising: a WLAN interface, for receiving at least a playback audio packet generated by the first device during the voice communication with the remote device through a WLAN, getting audio information-to-be-played out of the playback audio packet, inserting audio information captured by the WLAN device into at least a captured audio packet, and sending the captured audio packet to the first device through the WLAN for the first device to perform the voice communication with the remote device; a microphone, coupled to the WLAN interface, for capturing outside audio information to be inserted into the captured audio packet by the WLAN interface; and a speaker, coupled to the WLAN interface, for playing audio information-to-be-played got out of the playback audio packet by the WLAN interface.

According to still another embodiment of the present invention, the present invention discloses a WLAN device, comprising: a WLAN interface, for receiving at least a playback music packet through a WLAN and getting music information-to-be-played out of the playback music packet; and a speaker, coupled to the WLAN interface, for playing music information-to-be-played got out of the playback music packet by the WLAN interface.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
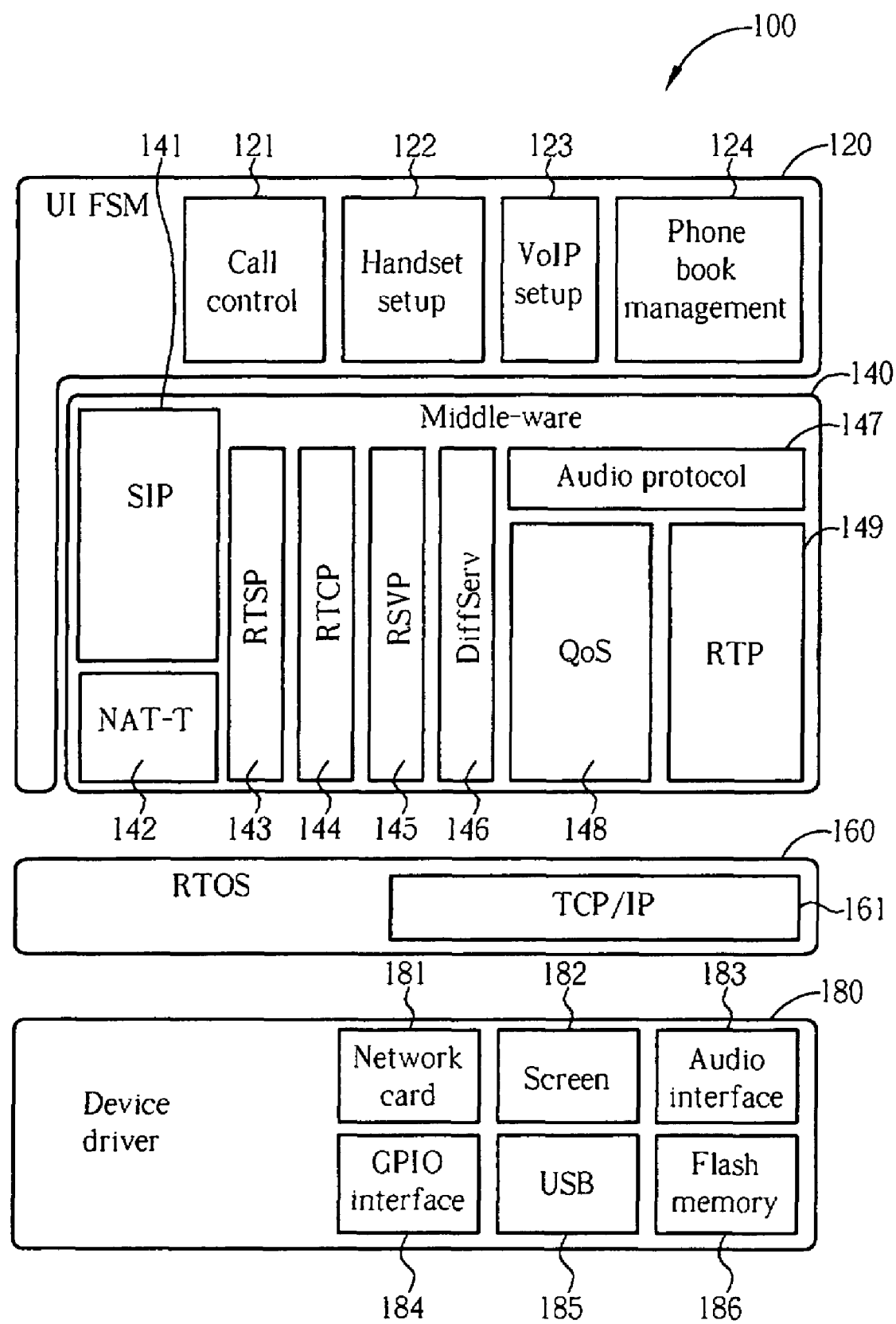
FIG. 1 is a schematic diagram illustrating an example of a software architecture of a VoIP phone of the prior art.
Figure 2:
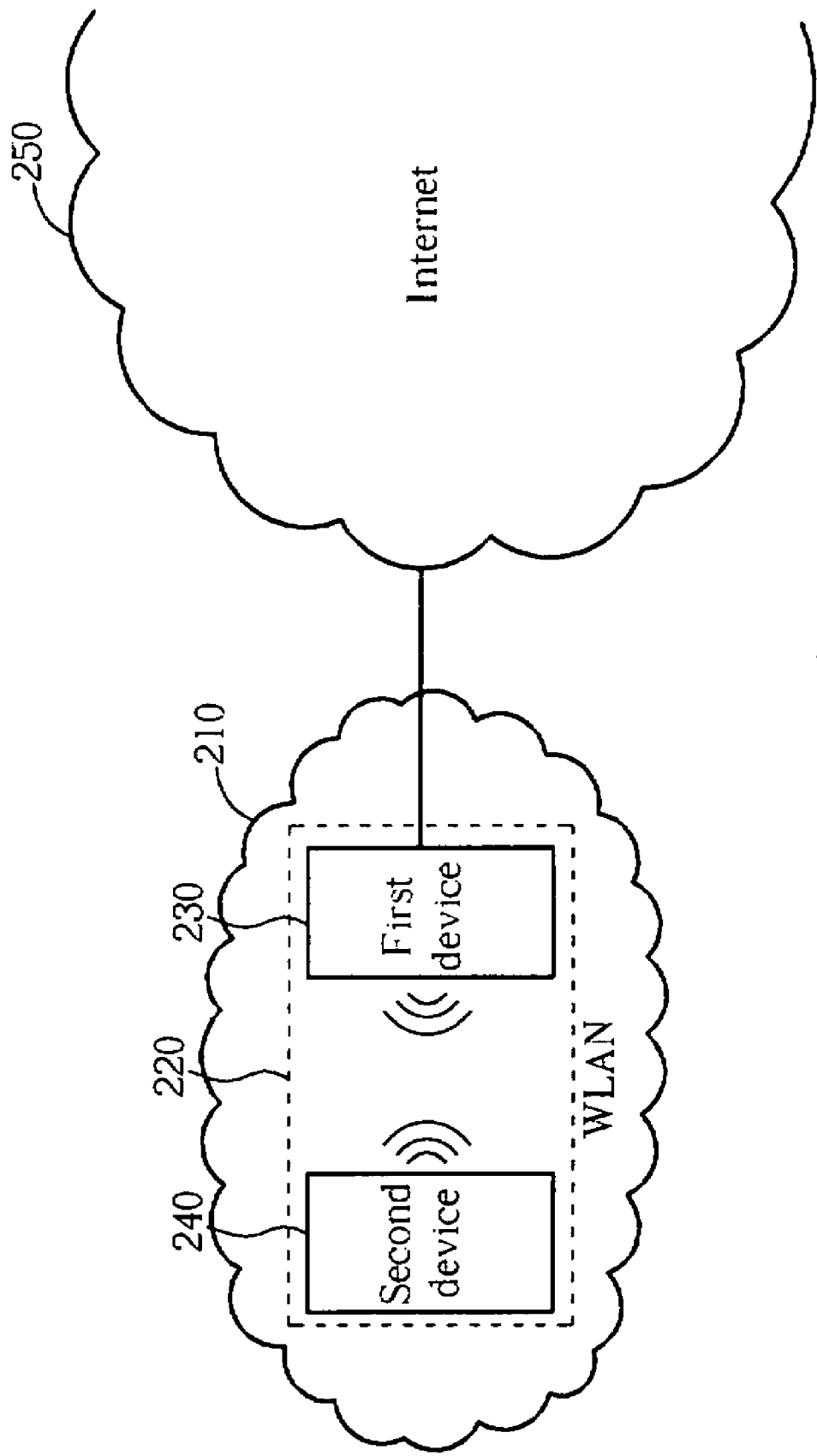
FIG. 2 is a schematic diagram illustrating an embodiment of a VoIP system of the present invention.

FIG. 2 is a schematic diagram illustrating an embodiment of a voice over Internet protocol (VoIP) system 220 of the present invention. As shown, the VoIP system 220 comprises a first device 230 and a second device 240. The first device 230 and the second device 240 are disposed in a wireless local area network (WLAN) 210. The two devices 230, 240 can communicate wirelessly with each other according to a WLAN protocol, such as an institute of electrical and electronics engineers (IEEE) 802.11 series protocol or a wireless fidelity (Wi-Fi) protocol. Additionally, the first device 230 is connected to an Internet 250. Specifically, the first device 230 is one of the electronic devices having processing capability, having WLAN interfaces, and capable of being connected to the Internet 250, such as a computer or a media center. The second device 240 is one of the electronic devices having WLAN interfaces and capable of capturing and playing sounds (e.g. audio information or music information), such as a handheld phone having a WLAN interface.

In this embodiment, since the first device 230 (e.g. a computer) takes charge of complicated VoIP related operations, the second device 240 can be much simpler than the VoIP phone 100 of the prior art. Especially, a middle-ware layer of the second device 240 is much simpler than the middle-ware layer 140 of the VoIP phone 100. Thus, the second device 240 can be made by less complicated hardware than before. Additionally, the second device 240 consumes little power since it does not perform complicated operations as described above. The second device 240 is thus superior to the conventional VoIP phone 100 regarding hardware cost and power consumption. Presently, computers owned by most people have powerful processing capability, so a user can utilize his own computer to implement the first device 230. Moreover, the user can easily implement the VoIP system 220 of this embodiment after purchasing a second device 240 with merely little money.

Through the Internet 250, the first device 230 can perform peer-to-peer (P2P) VoIP voice communication with a remote device (not shown in drawings) in the Internet 250. The first device 230 takes charge of heavy tasks corresponding to session initiation protocol (SIP) 141, network address translation traversal (NAT-T) 142, real time streaming protocol (RTSP) 143, real time transport control protocol (RTCP) 144, resource reserve protocol (RSVP) 145, differentiated services (DiffServ) 146, audio protocol 147, quality of service (QoS) 148, and real time transport protocol (RTP) 149. In this embodiment, the first device 230 processes audio information received during the VoIP communication to generate at least a playback audio packet and sends the playback audio packet to the second device 240 through the WLAN 210 to be played by the second device 240. Additionally, the playback audio packet complies with standards of the WLAN and contains audio information that can be directly played, such as pulse-code modulation (PCM) audio information.

As described above, the second device 240 plays audio information contained in the playback audio packet sent from the first device 230. Besides, the second device 240 captures outside audio information (e.g. voices from the user), encodes captured audio information into at least a captured audio packet, and sends the captured audio packet to the first device 230 through the WLAN 210. Additionally, the captured audio packet complies with standards of the WLAN and contains some audio information, such as PCM audio information. The first device 230 further processes the captured audio packet to generate audio information to be sent out during the VoIP communication. Additionally, the second device 240 may comprise an unsophisticated input/output interface for the user to execute VoIP related controls, such as phone number input and phone book management. Besides packets containing audio information, the first device 230 and the second device 240 can send packets containing VoIP related information to each other through the WLAN 210.

Figure 3:
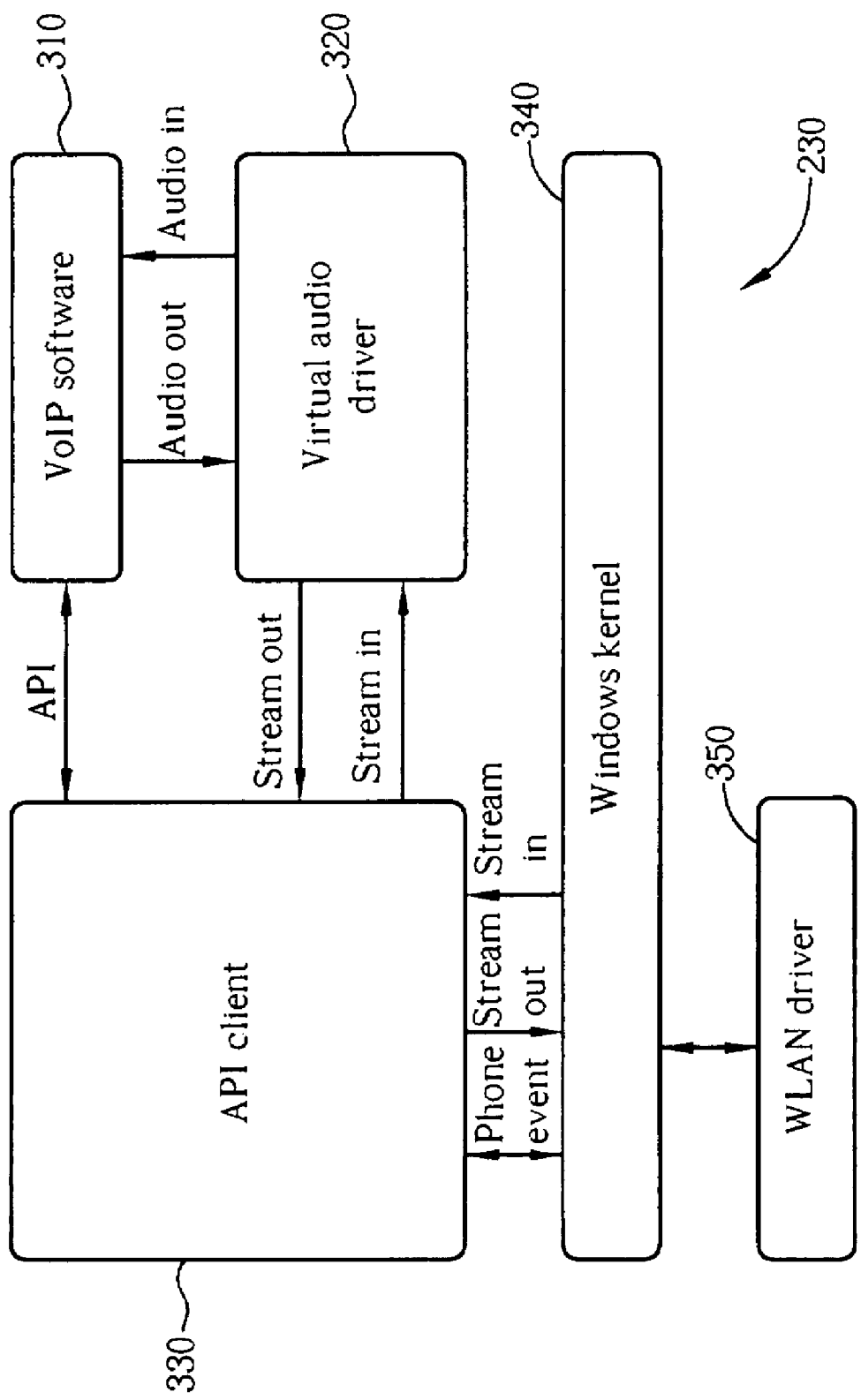
FIG. 3 is a schematic diagram illustrating an example of a software architecture of a first device in FIG. 2.

FIG. 3 is a schematic diagram illustrating an example of a software architecture of the first device 230 in FIG. 2. As shown, the first device 230 executes VoIP software 310, a virtual audio driver program 320, an application program interface (API) client program 330, a Windows kernel program 340, and a WLAN driver program 350. The Windows kernel program 340 and the WLAN driver program 350 inherently exist in most computers. The VoIP software 310 can be purchased or downloaded from the Internet 250 by the user with little efforts. The virtual audio driver program 320 and the API client program 330 of the first device 230 are unusual and not provided in the prior art.

For the VoIP software 310, the virtual audio driver program 320 acts like a real sound effect card connected to a real microphone and a real speaker. The VoIP software 310 thus treats the virtual audio driver program 320 as an input/output interface of audio information. In other words, the VoIP software 310 can receive audio information from the virtual audio driver program 320, wherein the received audio information is required by the user to be sent to the remote device. Additionally, the VoIP software 310 processes audio information received from the virtual audio driver program 320 and sends audio information generated during the VoIP communication (i.e. audio information-to-be-played) to the virtual audio driver program 320.

In this embodiment, the API client program 330 sends audio information output from the virtual audio driver program 320 to the WLAN driver program 350 through the Windows kernel program 340 and sends audio information output from the WLAN driver program 350 through the Windows kernel program 340 to the virtual audio driver program 320. The API client program 330 also sends VoIP control commands (e.g. dialing control commands input by the user) output from the WLAN driver program 350 through the Windows kernel program 340 to the VoIP software 310 and sends software status information, communication status information, or related notification information output from the VoIP software 310 to the WLAN driver program 350.

The WLAN driver program 350 encodes information sent from the API client program 330 through the Windows kernel program 340 into WLAN packets that contain the playback audio packet to be further sent to the second device 240 through the WLAN 210. Additionally, the WLAN driver program 350 gets payloads (i.e. information content) out of WLAN packets that contain the captured audio packet sent from the second device 240 through the WLAN 210 to be further sent to the API client program 330 through the Windows kernel program 340.

Figure 4:
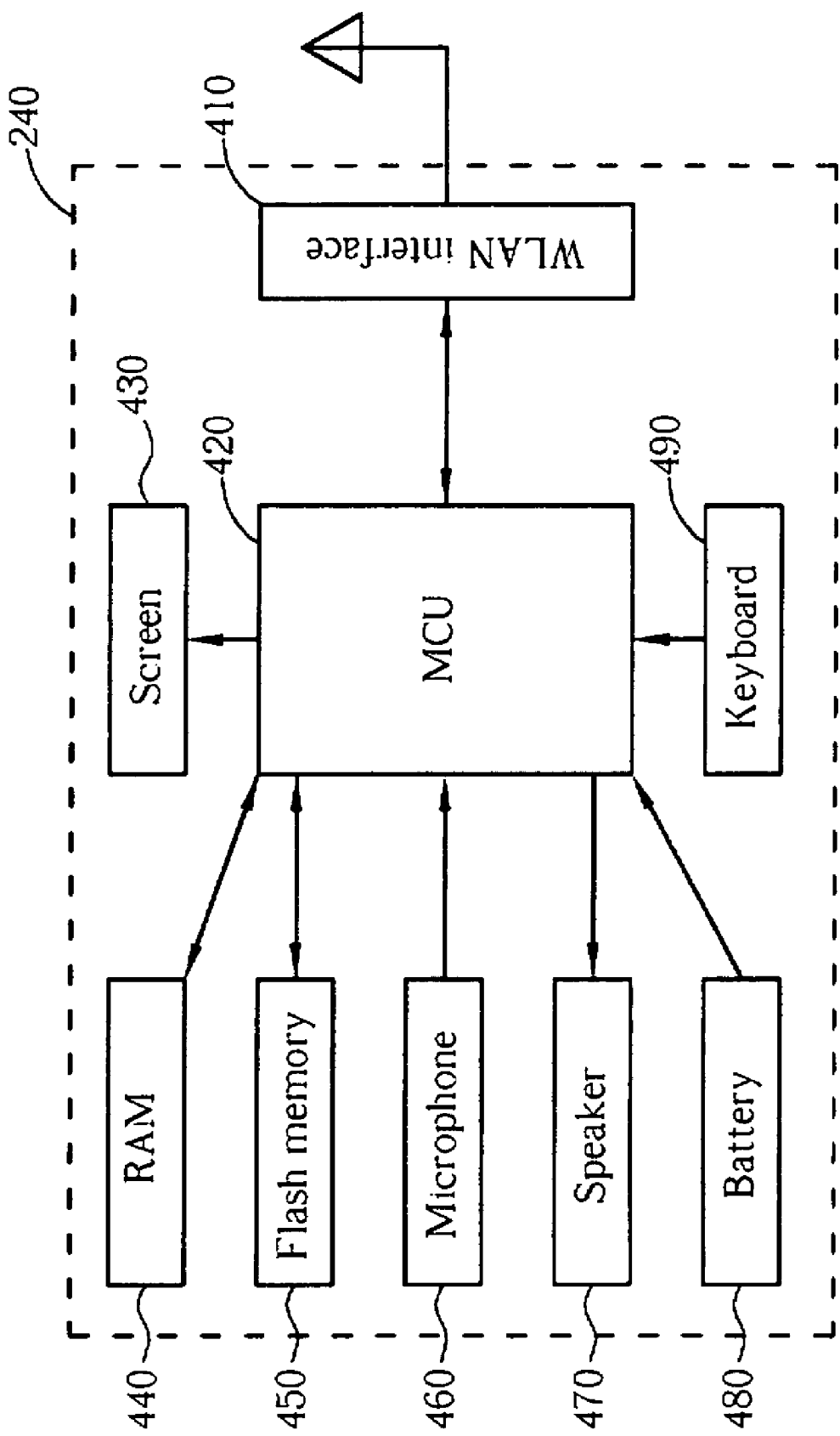
FIG. 4 is a schematic diagram illustrating an example of a hardware architecture of a second device in FIG. 2.

As described above, the second device 240 is superior to the conventional VoIP phone 100 regarding hardware cost due to its less complicated software architecture. FIG. 4 is a schematic diagram illustrating an example of a hardware architecture of the second device 240 in FIG. 2. As shown, the second device 240 comprises a WLAN interface 410, a micro-controlling unit (MCU) 420, a screen 430, a random access memory (RAM) 440, a flash memory 450, a microphone 460, a speaker 470, a battery 480, and a keyboard 490. In this embodiment, the second device 240 receives the playback audio packet and sends out the captured audio packet through the WLAN interface 410. Please note that the second device 240 is more than an earphone or a microphone. Specifically, the second device 240 has an unsophisticated input/output interface for the user to execute basic VoIP related controls, such as phone number input, phone book management. Furthermore, the second device 240 can display basic VoIP related information for the user.

Figure 5:
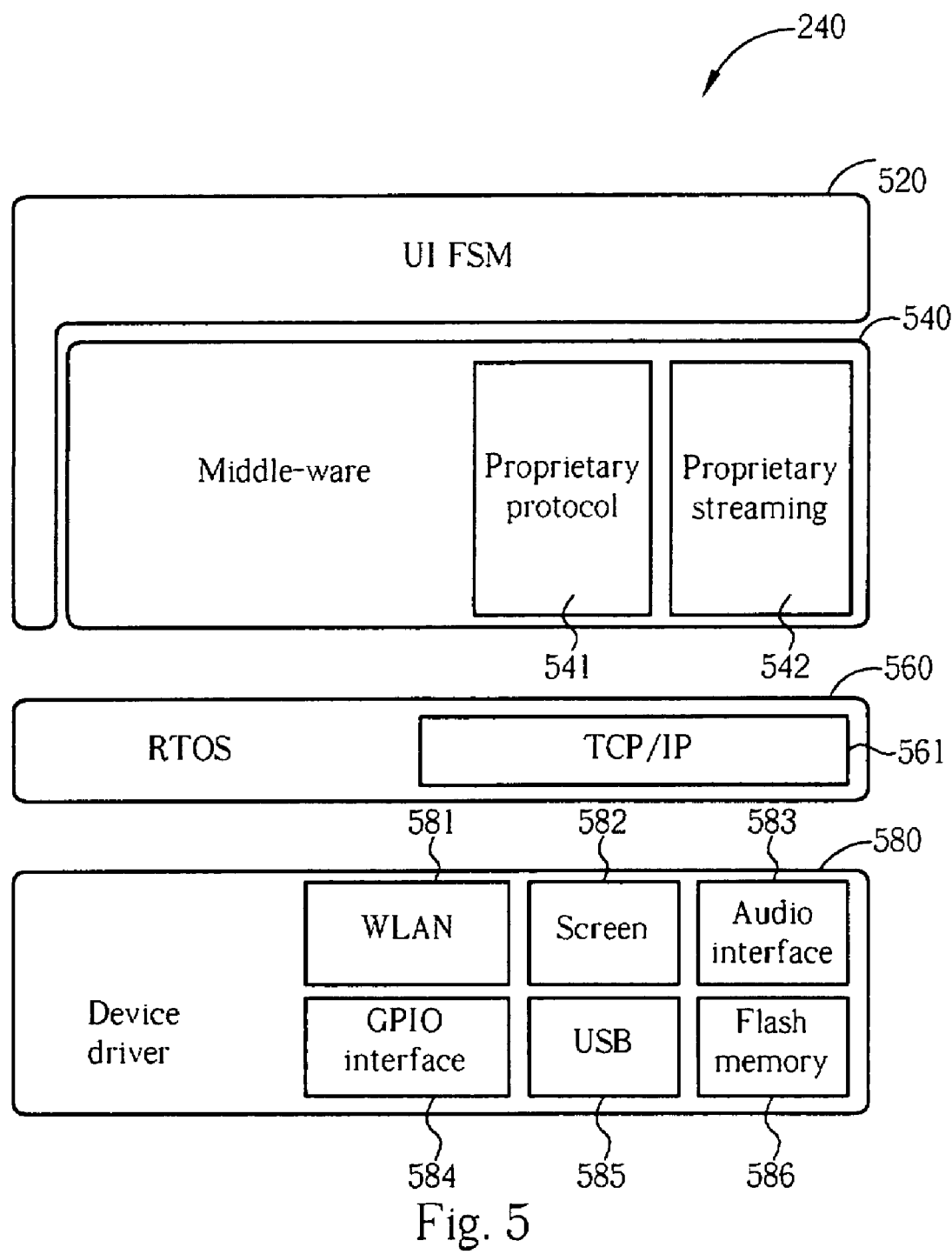
FIG. 5 is a schematic diagram illustrating an example of a software architecture of a second device in FIG. 2.

FIG. 5 is a schematic diagram illustrating an example of a software architecture of the second device 240 in FIG. 2. As shown, the software architecture of the second device 240 comprises four layers as follows: a user interface finite state machine (UI FSM) layer 520, a middle-ware layer 540, a real time operating system (RTOS) layer 560, and a device driver layer 580. It is obvious that the middle-ware layer 540 of the second device 240 in this embodiment is much simpler than the middle-ware layer 140 of the conventional VoIP phone 100. Specifically, the middle-ware layer 540 is free from tasks corresponding to SIP, RTSP, RTCP, or RSVP. In this embodiment, the middle-ware layer 540 utilizes an unsophisticated proprietary protocol 541 and proprietary streaming standard 542 to perform basic communication of VoIP control information and status information and perform flow control of WLAN packets. Additionally, the RTOS layer 560 operates on a transmission control protocol/Internet protocol (TCP/IP) 561. The device driver layer 580 comprises a WLAN driver 581, a screen driver 582, an audio interface driver 583, a general-purpose input/output (GPIO) interface driver 584, a universal serial bus (USB) driver 585, and a flash memory driver 586.

In this embodiment, the VoIP system 220 utilizes the WLAN 210 as a communication infrastructure for the first device 230 and the second device 240. The WLAN 210 is a widely used and powerful wireless communication solution with fairly good transmission rates and distances. The VoIP system 220 thus has advantages of high bandwidth, more common wireless communication solutions, coverage over most user scenarios, and expandability of user scenarios.

Additionally, since the second device 240 has WLAN functions, Wi-Fi functions, and functions to capture/play audio information, it can be applied in many other cases besides the VoIP communication as described above. For example, the second device 240 may have two modes: a VoIP mode and a music mode. Under the VoIP mode, the second device 240 performs the above-mentioned VoIP related operations. Under the music mode, the user uses the second device 240 as a wireless earphone to listen to music, or as a wireless microphone. Specifically, under the music mode, the user utilizes the first device 230 to select a music file-to-be-played stored in the first device 230. The first device 230 then inserts the music file-to-be-played into at least a playback music packet and sends the playback music packet to the second device 240 through the WLAN 210. Further, the WLAN interface 410 of the second device 240 receives the playback music packet through the WLAN 210 and gets music information-to-be-played out of the playback music packet. Additionally, the speaker 470 plays music information-to-be-played got out of the playback music packet by the WLAN interface 410.

Besides, under the music mode, the first device 230 can notify the second device 240 whether/which music files are playable through the WLAN 210. The second device 240 thus displays the playable music files on the screen 430. Therefore, the user selects a music file-to-be-played stored in the first device 230 through the keyboard 490, and then the first device 230 inserts the selected music file into at least a playback music packet and sends the playback music packet to the second device 240 through the WLAN 210. The WLAN interface 410 of the second device 240 thus receives the playback music packet through the WLAN 210 and gets music information-to-be-played out of the playback music packet. Further, the speaker 470 plays music information-to-be-played got out of the playback music packet by the WLAN interface 410.

The above-mentioned music mode is an improved functionality of the VoIP system 220 in this embodiment.

Please note that, although the above embodiment is explained with a VoIP system, the principles of the present invention can also be applied in a video over Internet protocol system. Additionally, the second device 240 may further comprise related hardware for playing/capturing video information to perform video over Internet protocol related operations. The operations behind a video over Internet protocol system and a VoIP system are substantially the same expect that the former performs video communication, and the latter performs voice communication. Therefore, after reading the above description as to the VoIP system, those skilled in this art can easily understand the operations of the video over Internet protocol system and thus further description is omitted herein for simplicity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless local area network (WLAN) device, for performing voice communication with a remote device through a first device, comprising:

a WLAN interface, for receiving at least a playback audio packet generated by the first device during the voice communication with the remote device through a WLAN, getting audio information-to-be-played out of the playback audio packet, inserting audio information captured by the WLAN device into at least a captured audio packet, and sending the captured audio packet to the first device through the WLAN for the first device to perform the voice communication with the remote device;

a microphone, coupled to the WLAN interface, for capturing outside audio information to be inserted into the captured audio packet by the WLAN interface; and a speaker, coupled to the WLAN interface, for playing audio information-to-be-played got out of the playback audio packet by the WLAN interface;

wherein the first device executes VoIP software to perform the voice communication with the remote device and executes a virtual audio driver program as an audio input/output interface of the VoIP software, the VoIP software processes audio information received from the visual audio driver program and sends audio information generated during the VoIP communication to the virtual audio driver program, wherein under a music mode, the WLAN interface receives at least a playback music packet through the WLAN wirelessly, and the speaker plays music information contained in the playback music packet, when a user utilizes the first device to select a music file-to-be-played, and the first device inserts information in the music file-to-be-played into the playback music packet and sends the playback music packet to the WLAN device.

2. The WLAN device of claim 1, wherein the WLAN complies with an institute of electrical and electronics engineers (IEEE) 802.11 series standard or a wireless fidelity (Wi-Fi) standard.

3. The WLAN device of claim 1, wherein the WLAN device is a handheld phone.

4. The WLAN device of claim 1, wherein a user utilizes the WLAN device to select a music file-to-be-played, and the first device inserts information in the music file-to-be-played into the playback music packet and sends the playback music packet to the WLAN device.

5. A voice over Internet protocol (VoIP) system, comprising:

a first device, disposed in a WLAN and connected to an Internet, for performing voice communication with a remote device through the Internet, wherein the first device processes audio information received during the voice communication with the remote device to generate at least a playback audio packet, sends out the playback audio packet through the WLAN, receives at least a captured audio packet through the WLAN, and processes the captured audio packet to generate audio information to be sent out during the voice communication with the remote device; and a second device, disposed in the WLAN, for receiving the playback audio packet through the WLAN, playing audio information contained in the playback audio packet, capturing outside audio information to generate the captured audio packet, and sending out the captured audio packet through the WLAN;

wherein the first device executes VoIP software to perform the voice communication with the remote device through the Internet and executes a virtual audio driver program as an audio input/output interface of the VoIP software, the VoIP software processes audio information received from the virtual audio driver program and sends audio information generated during the VoIP communication to the virtual audio driver program, wherein the second device further comprises:

a WLAN interface, for receiving the playback audio packet from the first device through the WLAN, getting audio information-to-be-played out of the playback audio packet, inserting audio information captured by the WLAN device into the captured audio packet, and sending the captured audio packet to the first device through the WLAN;

a microphone, coupled to the WLAN interface, for capturing outside audio information to be inserted into the captured audio packet by the WLAN interface; and a speaker, coupled to the WLAN interface, for playing audio information-to-be-played got out of the playback audio packet by the WLAN interface;

wherein under a music mode, the WLAN interface receives at least a playback music packet through the WLAN wirelessly, and the speaker plays music information contained in the playback music packet, and when a user utilizes the first device to select a music file-to-be-played, and the first device inserts information in the music file-to-be-played into the playback music packet and sends the playback music packet to the WLAN device.

6. The VoIP system of claim 5, wherein the first device further executes an application program interface (API) client program and a WLAN driver program, and the API client program sends audio information output from the virtual audio driver program to the WLAN driver program and sends audio information output from the WLAN driver program to the virtual audio driver program.

7. The VoIP system of claim 6, wherein the WLAN driver program generates the playback audio packet according to audio information received from the API client program and gets audio information out of the captured audio packet received through the WLAN to be output to the API client program.

8. The VoIP system of claim 6, wherein the API client program further sends control information and/or status information of the VoIP software between the WLAN driver program and the VoIP software.

9. The VoIP system of claim 5, wherein the WLAN complies with an IEEE 802.11 series standard or a Wi-Fi standard.

10. The VoIP system of claim 5, wherein the first device is a computer having a WLAN interface.

11. The VoIP system of claim 5, wherein the second device is a handheld phone.

12. The VoIP system of claim 5, wherein a user utilizes the second device to select a music file-to-be-played, and the first device inserts information in the music file-to-be-played into the playback music packet and sends the playback music packet to the second device.

* * * * *